United States Patent
Beaumont

(10) Patent No.: US 12,260,528 B2
(45) Date of Patent: *Mar. 25, 2025

(54) GRAPHICS PROCESSING SYSTEMS AND METHODS

(71) Applicant: Imagination Technologies Limited, Kings Langley (GB)

(72) Inventor: Ian Beaumont, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,307

(22) Filed: Dec. 11, 2023

(65) Prior Publication Data

US 2024/0112311 A1 Apr. 4, 2024

Related U.S. Application Data

(63) Continuation of application No. 17/555,612, filed on Dec. 20, 2021, now Pat. No. 11,842,462.

(30) Foreign Application Priority Data

Dec. 18, 2020 (GB) .................................. 2020128
Feb. 19, 2021 (GB) .................................. 2102370

(51) Int. Cl.
*G06T 5/70* (2024.01)
*G06T 15/00* (2011.01)

(52) U.S. Cl.
CPC .............. *G06T 5/70* (2024.01); *G06T 15/005* (2013.01)

(58) Field of Classification Search
CPC ................................ G06T 5/70; G06T 15/005
See application file for complete search history.

(56) References Cited

U.S. PATENT DOCUMENTS

| | | | |
|---|---|---|---|
| 2006/0007234 A1 | 1/2006 | Hutchins et al. | |
| 2006/0170703 A1* | 8/2006 | Liao .................... | G06T 9/00 345/613 |
| 2007/0229503 A1 | 10/2007 | Witzel et al. | |
| 2010/0026682 A1 | 2/2010 | Plowman et al. | |
| 2010/0060630 A1 | 3/2010 | Nystad et al. | |
| 2016/0110837 A1 | 4/2016 | Sideris et al. | |
| 2017/0061678 A1* | 3/2017 | Engh-Halstvedt .... | G06T 15/005 |
| 2018/0061117 A1 | 3/2018 | Pohl | |
| 2018/0197323 A1 | 7/2018 | Howson et al. | |
| 2020/0004587 A1 | 1/2020 | Griffin et al. | |

FOREIGN PATENT DOCUMENTS

| | | |
|---|---|---|
| CN | 108305314 A | 7/2018 |
| EP | 3185128 A1 | 6/2017 |
| EP | 3349181 A1 | 7/2018 |

OTHER PUBLICATIONS

Wikipedia, "Tiled Rendering," https"//en.wikipedia.org/w/index.php?title=Tiled_rendering&oldid=967514138; pp. 1-5 (*note: copy in parent apn).

* cited by examiner

*Primary Examiner* — Michelle Chin
(74) *Attorney, Agent, or Firm* — Potomac Law Group, PLLC; Vincent M DeLuca

(57) ABSTRACT

A graphics processing system is configured to render primitives using a rendering space that is sub-divided into sections, wherein the graphics processing system includes assessment logic configured to make an assessment regarding the presence of primitive edges in a section, and determination logic configured to determine an anti-aliasing setting for the section based on the assessment.

20 Claims, 9 Drawing Sheets

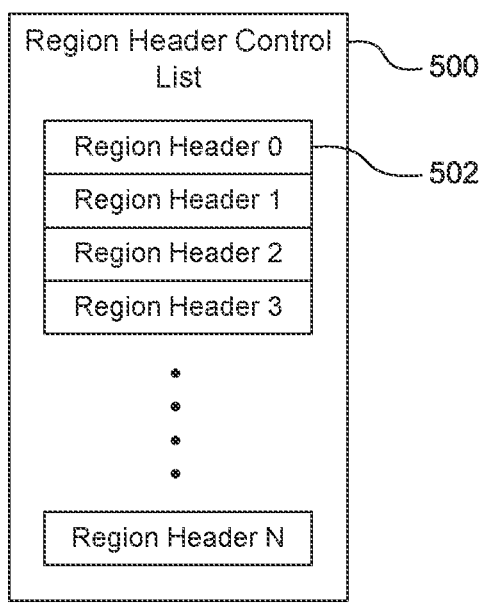
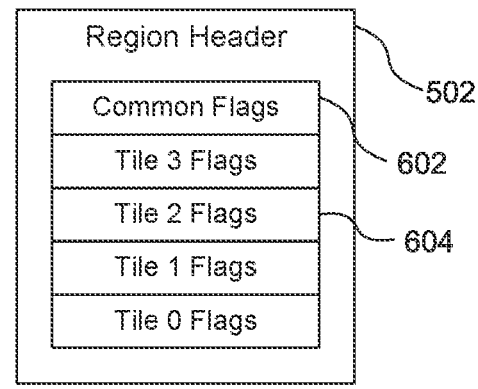
FIGURE 5
FIGURE 6
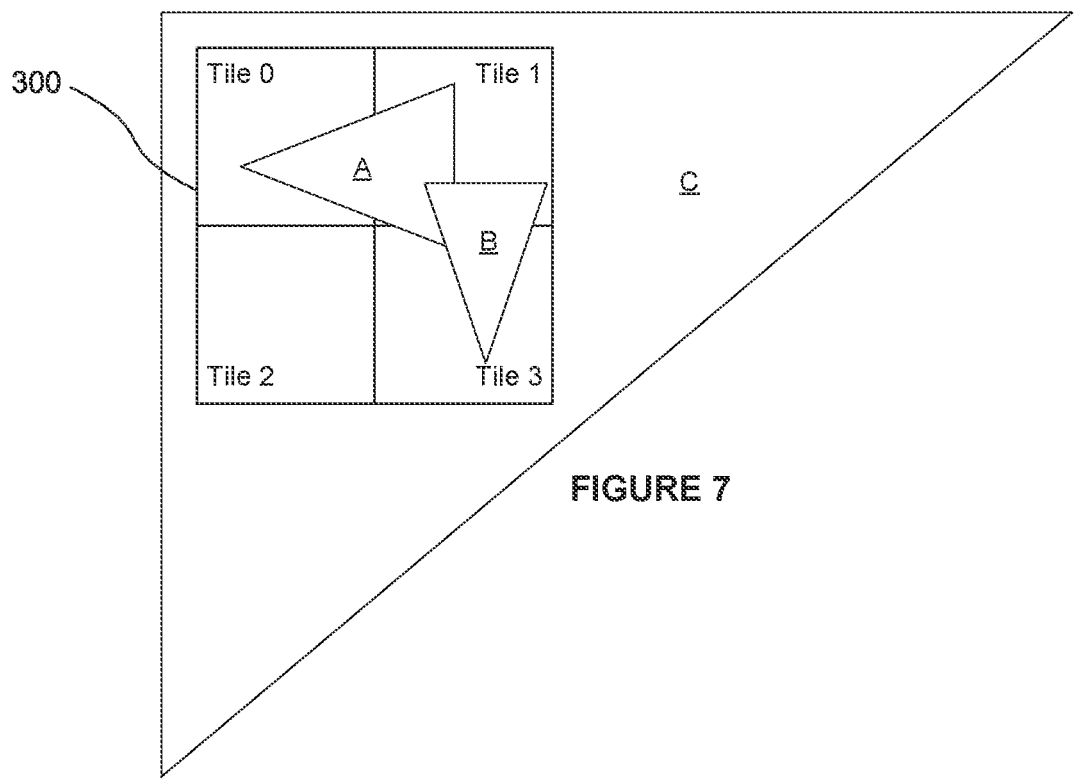
FIGURE 7

GRAPHICS PROCESSING SYSTEMS AND METHODS

CROSS REFERENCE TO RELATED APPLICATIONS AND CLAIM OF PRIORITY

This application is a continuation, under 35 U.S.C. 120, of copending application Ser. No. 17/555,612 filed Dec. 20, 2021, now U.S. Pat. No. 11,842,462, which claims foreign priority under 35 U.S.C. 119 from United Kingdom Application Nos. 2020128.1 filed Dec. 18, 2020, and 2102370.0 filed Feb. 19, 2021, the contents of which are incorporated by reference herein in their entirety.

TECHNICAL FIELD

The present disclosure relates to graphics processing systems and methods relating to performing anti-aliasing. The disclosure is particularly applicable to tile-based graphics processing systems.

BACKGROUND

Graphics processing systems are typically configured to receive graphics data, e.g. from an application running on a computer system, and to render the graphics data to provide a rendering output. For example, the graphics data provided to a graphics processing system may describe geometry within a three dimensional (3D) scene to be rendered, and the rendering output may be a rendered image of the scene. Some graphics processing systems (which may be referred to as "tile-based" graphics processing systems) use a rendering space which is subdivided into a plurality of tiles. The "tiles" are sections of the rendering space, and may have any suitable shape, but are typically rectangular (where the term "rectangular" includes square). As is known in the art, there are many benefits to subdividing the rendering space into tile sections. For example, subdividing the rendering space into tile sections allows an image to be rendered in a tile-by-tile manner, wherein graphics data for a tile can be temporarily stored "on-chip" during the rendering of the tile, thereby reducing the amount of data transferred between a system memory and a chip on which a graphics processing unit (GPU) of the graphics processing system is implemented.

Tile-based graphics processing systems typically operate in two phases: a geometry processing phase and a rendering phase. In the geometry processing phase, the graphics data for a render is analysed to determine, for each of the tiles, which graphics data items are present within that tile. Then in the rendering phase (e.g. a rasterisation phase), a particular tile can be rendered by processing those graphics data items which are determined to be present within that tile (without needing to process graphics data items which were determined in the geometry processing phase to not be present within the particular tile).

Anti-aliasing can be used to improve the appearance of primitive edges in a rendered image. This can be done by using more than one sample per pixel to render the image. For example, when rendering a scene using anti-aliasing, for each pixel to be rendered, multiple colour and depth samples can be calculated and stored. The final processing of a colour value can take an average of the colours of the samples, such that a final pixel's value is representative of multiple sample points within the pixel. This typically improves the appearance of jagged edges by blending the colour from a given primitive's edge with a background or another primitive adjacent to that edge (as viewed in the image—the two primitives may actually be at different depths within a three dimensional scene to be rendered).

Typical game scenes may contain many thousands of edges and the results of enabling anti-aliasing can be very pleasing to the eye. Anti-aliasing can also be enabled for Graphical User Interface (GUI) type scenes, although the number of edges within a typical GUI-type scene can be orders of magnitude less than that of a typical game scene.

In tile-based graphics processing systems, a typical tile may be sized to 16×16 samples (16 samples in the X dimension and 16 samples in the Y dimension), and the processing pipeline may be constrained to only work with tiles of this sample size. A typically sized frame buffer of 1280×720 pixels would thus be processed using 3600 tiles, assuming no anti-aliasing (i.e. at a sample resolution of one sample per pixel), with each tile representing a 16×16 pixel (grid) section of the frame buffer. An anti-aliasing (AA) setting that required processing two samples per pixel in only the Y direction, referred to herein as "2×AA", would effectively double the total number of samples and so double the number of tiles (because the tiles are of a fixed sample size) required to process a single frame buffer. For example, the aforementioned tile sized to 16×16 samples would only cover a 16×8 pixel area at the 2×AA sample resolution, so two tiles would be required to cover the original 16×16 pixel area that was covered with a single tile without anti-aliasing (and thus a sample resolution of one sample per pixel). Similarly, processing two samples in both the X and Y direction, herein referred to as "4×AA", would require processing two times the number of samples in the X direction and two times the number of samples in the Y direction, thus quadrupling the number of samples and number of tiles required compared to the situation without anti-aliasing. Other anti-aliasing settings can also be performed by further increasing the number of samples processed.

Clearly, as the number of samples required to be render is increased (due to anti-aliasing), the amount of processing to render a single frame buffer also increases, which in turn reduces the apparent performance of the system. As well as the additional time required to process more samples, the increase in number of tiles can also have further undesirable knock-on effects in the system. For example, any latency introduced by system bottlenecks encountered when finishing one tile and moving to another will become more problematic with an increased number of tiles to process for one frame buffer.

The present invention aims to at least partly solve these problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one aspect, there is provided a graphics processing system configured to render a scene using a rendering space that is sub-divided into sections, wherein the graphics processing system comprises: assessment logic configured to make an assessment regarding the presence of primitive edges in a section; and determination logic configured to determine an anti-aliasing setting for the section based on the assessment. The sections can be tiles of a tile-based graphics system. The assessment logic can be part of geometry processing logic, in particular a tiling unit. The determination logic can be part of geometry processing logic, or part of rendering logic, or could be distributed between the two.

Optionally, the determination logic is configured to determine the anti-aliasing setting for a section based on the assessment for the section and at least one other assessment for at least one other section.

Optionally, the assessment logic is configured to make an assessment regarding the presence of primitive edges for each of the sections.

Optionally, the rendering space is divided into regions, each region comprising a group of sections, and the determination logic is configured to determine a common anti-aliasing setting for a subset of the sections within the region.

Optionally, the rendering space is sub-divided into sections based on a number of samples each section contains at a maximum anti-aliasing setting, and the system further comprises: rendering logic configured to render the rendering space section-by-section at a maximum anti-aliasing setting. That is, the rendering logic is configured to separately render sections having the maximum anti-aliasing setting.

Optionally, the rendering logic can be further configured to render together, rather than section-by-section, the sections within a subset of sections of a region that have a common anti-aliasing setting that is not the maximum anti-aliasing setting.

Optionally, the rendering logic is configured to render the subset of sections, within a region, together by rendering the subset of sections together at a lower sample resolution than when rendering a section at the maximum anti-aliasing setting.

Optionally, determining the anti-aliasing setting for a section comprises enabling or disabling anti-aliasing for the section and, enabling anti-aliasing can indicate that the section should be rendered with the maximum anti-aliasing setting.

Optionally, the geometry processing logic is further configured to produce a per-region region header, comprising common settings applicable to the sections within the group of sections forming the region.

According to a second aspect, there is provided a method of rendering primitives in a graphics processing system that is configured to render primitives using a rendering space that is sub-divided into sections, wherein the method comprises: making an assessment regarding the presence of primitive edges in a section; and determining an anti-aliasing setting for the section based on the assessment.

Optionally, determining an anti-aliasing comprises determining the anti-aliasing setting for a section based on the assessment for the section and at least one other assessment for at least one other section.

Optionally, making an assessment forms part of a geometry processing phase, and further comprises making an assessment regarding the presence of primitive edges for each of the sections.

Optionally, the rendering space is divided into regions, each region comprising a group of sections, and wherein determining an anti-aliasing setting further comprises determining a common anti-aliasing setting for a subset of the sections within the region.

Optionally, the rendering space is sub-divided into sections based on a number of samples each section contains at a maximum anti-aliasing setting, and the method further comprises: a rendering phase comprising rendering the rendering space section-by-section for sections with a maximum anti-aliasing setting.

Optionally, the rendering phase further comprises rendering together, rather than section-by-section, the sections within a subset of sections of a region that have a common anti-aliasing setting that is not the maximum anti-aliasing setting.

Optionally, the rendering together is performed by rendering the subset of sections together at a lower sample resolution than when rendering a section at the maximum anti-aliasing setting.

Optionally, determining the anti-aliasing setting for a section comprises enabling or disabling anti-aliasing for the section, and enabling anti-aliasing can cause the section to be rendered with the maximum anti-aliasing setting.

Optionally, the geometry processing phase further comprises producing a per-region region header, comprising common settings applicable to the sections within the group of sections forming the region.

According to a third aspect, there is provided a graphics processing system configured to perform the method of any of the variations of the second aspect.

The graphics processing system may be embodied in hardware on an integrated circuit. There may be provided a method of manufacturing, at an integrated circuit manufacturing system, a graphics processing system. There may be provided an integrated circuit definition dataset that, when processed in an integrated circuit manufacturing system, configures the system to manufacture a graphics processing system. There may be provided a non-transitory computer readable storage medium having stored thereon a computer readable description of a graphics processing system that, when processed in an integrated circuit manufacturing system, causes the integrated circuit manufacturing system to manufacture an integrated circuit embodying a graphics processing system.

There may be provided an integrated circuit manufacturing system comprising: a non-transitory computer readable storage medium having stored thereon a computer readable description of the graphics processing system; a layout processing system configured to process the computer readable description so as to generate a circuit layout description of an integrated circuit embodying the graphics processing system; and an integrated circuit generation system configured to manufacture the graphics processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIG. 5 is a schematic diagram of a region header control list;

FIG. 6 is a schematic diagram of a region header;

FIG. 7 shows an example of how primitives may intersect with tiles in a tile group;

Figure 1:
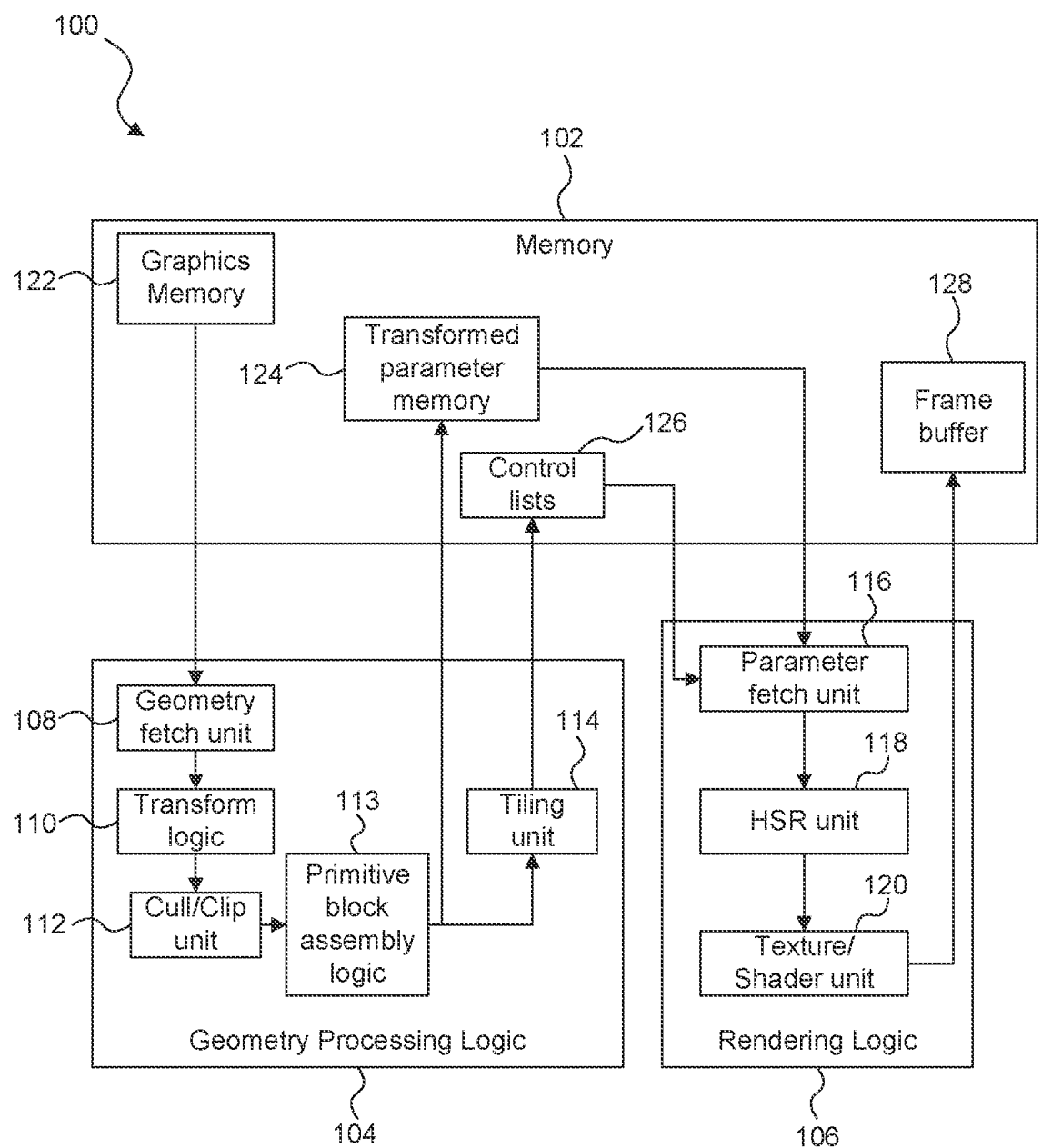
FIG. 1 shows a tile-based graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments will now be described by way of example only.

General System

FIG. 1 shows an example of a tile-based graphics processing system 100. As mentioned above, a tile-based graphics processing system uses a rendering space which is subdivided into a plurality of tiles. The tiles are sections of the rendering space, and may have any suitable shape, but are typically rectangular (where the term "rectangular" includes square). The tile sections within a rendering space are conventionally the same shape and size.

The system 100 comprises a memory 102, geometry processing logic 104 and rendering logic 106. The geometry processing logic 104 and the rendering logic 106 may be implemented on a GPU and may share some processing resources, as is known in the art. The geometry processing logic 104 comprises a geometry fetch unit 108, geometry transform logic 110, a cull/clip unit 112, primitive block assembly logic 113 and a tiling unit 114. The rendering logic 106 comprises a parameter fetch unit 116, a hidden surface removal (HSR) unit 118 and a texturing/shading unit 120. The system 100 is a so-called "deferred rendering" system, because the rendering is performed after the hidden surface removal. However, a tile-based system does not need to be a deferred rendering system, and although the present disclosure uses a deferred rendering system as an example, the ideas presented are also applicable to non-deferred (known as immediate mode) rendering systems. The memory 102 may be implemented as one or more physical blocks of memory, and includes a graphics memory 122, a transformed parameter memory 124, a control lists memory 126 and a frame buffer 128.

Figure 2:
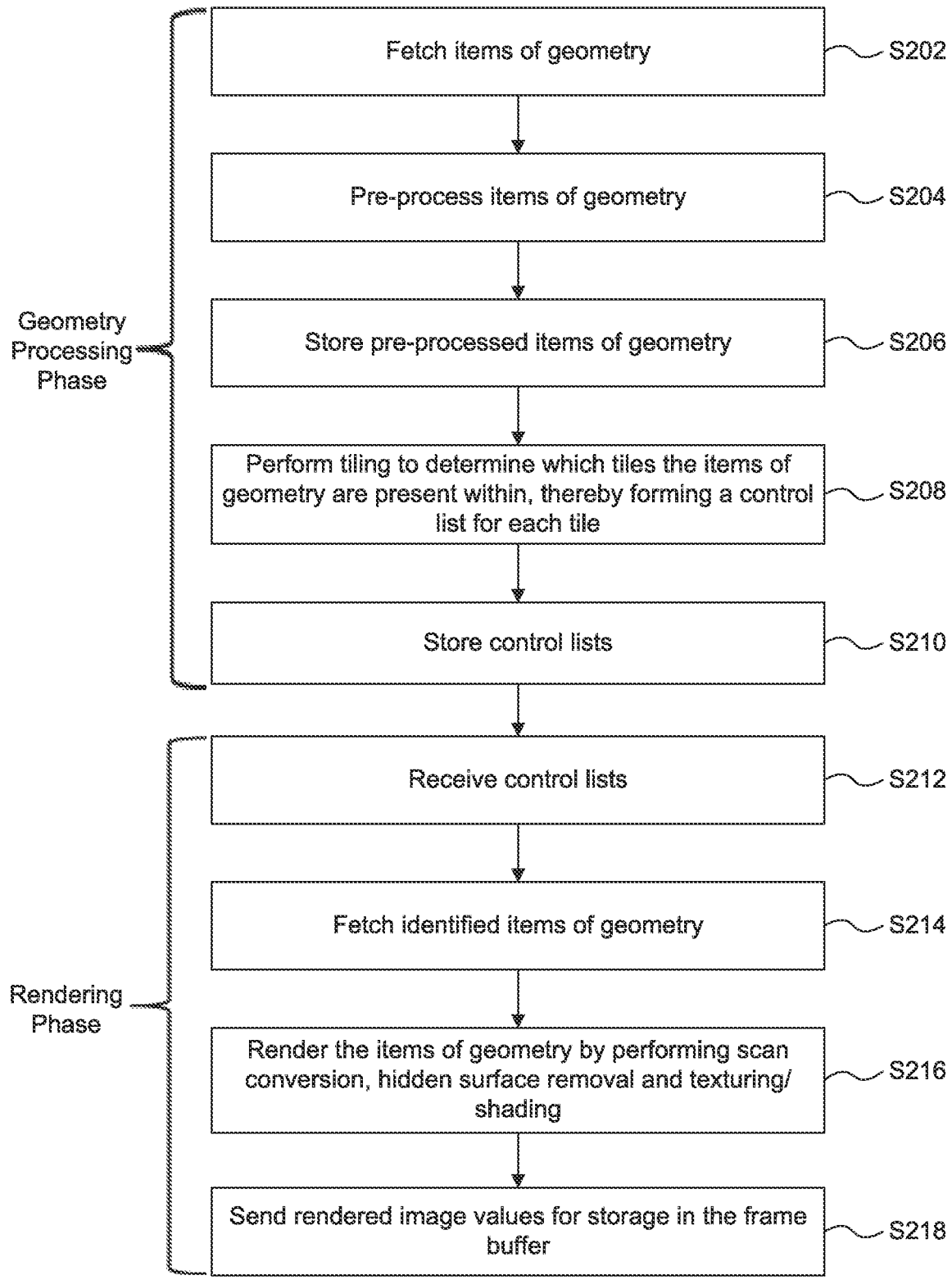
FIG. 2 shows a flowchart of a method of rendering primitives using the system of FIG. 1.

FIG. 2 shows a flow chart for a method of operating a tile-based rendering system, such as the system shown in FIG. 1. The geometry processing logic 104 performs the geometry processing phase, in which the geometry fetch unit 108 fetches geometry data (e.g. previously received from an application for which the rendering is being performed) from the graphics memory 122 (in step S202) and passes the fetched data to the transform logic 110. The geometry data comprises graphics data items (i.e. items of geometry) which describe geometry to be rendered. For example, the items of geometry may represent geometric shapes, which describe surfaces of structures in the scene. Items of geometry are often "primitives". A common primitive shape is a triangle, but primitives may be other 2D shapes and may be lines or points also. Primitives can be defined by their vertices, and vertex data can be provided describing the vertices, wherein a combination of vertices describes a primitive (e.g. a triangular primitive is defined by vertex data for three vertices). Objects can be composed of one or more such primitives. In some examples, objects can be composed of many thousands, or even millions of such primitives. Scenes typically contain many objects. Items of geometry can also be meshes (formed from a plurality of primitives, such as quads which comprise two triangular primitives which share one edge). Items of geometry may also be patches, wherein a patch is described by control points, and wherein a patch is tessellated to generate a plurality of tessellated primitives.

In step S204 the geometry processing logic 104 pre-processes the items of geometry, e.g. by transforming the items of geometry into screen space, performing vertex shading, performing geometry shading and/or performing tessellation, as appropriate for the respective items of geometry. For example, the transform logic 110 may transform the items of geometry into the rendering space and may apply lighting/attribute processing as is known in the art. The resulting data is passed to the cull/clip unit 112 which culls and/or clips any geometry which falls outside of a viewing frustum. The remaining transformed items of geometry (e.g. primitives) are provided to the primitive block assembly logic 113 which groups the items of geometry into blocks (which may be referred to as "primitive blocks") for storage. For example, each block may comprise up to N primitives, and up to M vertices, where the values of N and M are an implementation design choice. For example, N might be 24 and M might be 16. Each block can be associated with a block ID such that the blocks can be identified and referenced easily. Primitives often share vertices with other primitives, so storing the vertices for primitives in blocks allows the vertex data to be stored once in the block, wherein multiple primitives in the primitive block can reference the same vertex data in the block. In step S206 the primitive blocks with the transformed geometric data items are provided to the memory 102 for storage in the transformed parameter memory 124. The transformed items of geometry and information regarding how they are packed into the primitive blocks are also provided to the tiling unit 114. In step S208, the tiling unit 114 generates control stream data for each of the tiles of the rendering space, wherein the control stream data for a tile includes a control list of identifiers of transformed primitives which are to be used for rendering the tile, i.e. a list of identifiers of transformed primitives which are positioned at least partially within the tile. The collection of control lists of identifiers of transformed primitives for individual tiles may be referred to as a "control stream list". In step S210, the control stream data for the tiles is provided to the memory 102 for storage in the control lists memory 126. Therefore, following the geometry processing phase (i.e. after step S210), the transformed primitives to be rendered are stored in the transformed parameter memory 124 and the control stream data indicating which of the transformed primitives are present in each of the tiles is stored in the control lists memory 126.

In the rendering phase, the rendering logic 106 renders the items of geometry (primitives) in a tile-by-tile manner. In step S212, the parameter fetch unit 116 receives the control stream data for a tile, and in step S214 the parameter fetch unit 116 fetches the indicated transformed primitives from the transformed parameter memory 124, as indicated by the control stream data for the tile. In step S216 the rendering logic 106 renders the fetched primitives by performing sampling on the primitives to determine primitive fragments which represent the primitives at discrete sample points within the tile, and then performing hidden surface removal and texturing/shading on the primitive fragments. In particular, the fetched transformed primitives are provided to the hidden surface removal (HSR) unit 118 which performs the sampling to determine the primitive fragments, and removes primitive fragments which are hidden (e.g. hidden by other primitive fragments). Methods of performing sampling and hidden surface removal are known in the art. The term "fragment" refers to a sample of a primitive at a sampling point, which is to be processed to render pixels of an image. The term "sampling" is used herein to describe the process of determining fragments which represent items of geometry (e.g. primitives) at discrete sample points, but this process can sometimes be referred to as "rasterisation" or "scan conversion". As mentioned above, the system 100 of FIG. 1 is a deferred rendering system, and so the hidden surface removal is performed before rendering. However, other systems may render fragments before performing hidden surface removal to determine which fragments are visible in the scene.

In some examples, there may be a one-to-one mapping of fragments to pixels. However, in other examples there may be oversampling, generating multiple fragments per pixel to allow for higher quality rendering of pixel values, e.g. by facilitating anti-aliasing as discussed in more detail below. Primitives which are not removed by the HSR unit 118 are provided to the texturing/shading unit 120, which applies texturing and/or shading to primitive fragments. Although it is not shown in FIG. 1, the texturing/shading unit 120 may receive texture data from the memory 102 in order to apply texturing to the primitive fragments, as is known in the art. The texturing/shading unit 120 may apply further processing to the primitive fragments (e.g. alpha blending and other processes), as is known in the art in order to determine rendered pixel values of an image. The rendering phase is performed for each of the tiles, such that a whole image can be rendered with pixel values for the whole image being determined. In step S218, the rendered pixel values are provided to the memory 102 for storage in the frame buffer 128. The rendered image can then be used in any suitable manner, e.g. displayed on a display or stored in memory or transmitted to another device, etc.

Tile Grouping

Figure 3:
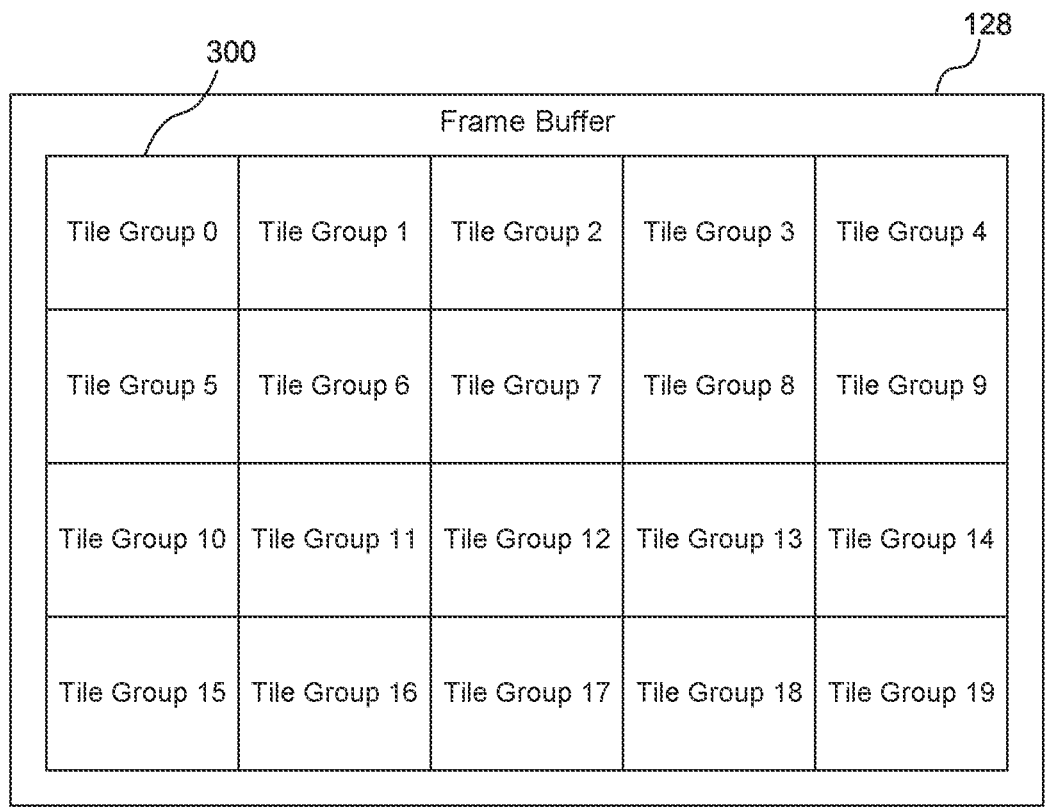
FIG. 3 is a schematic diagram of tile groups in a frame buffer.
Figure 4:
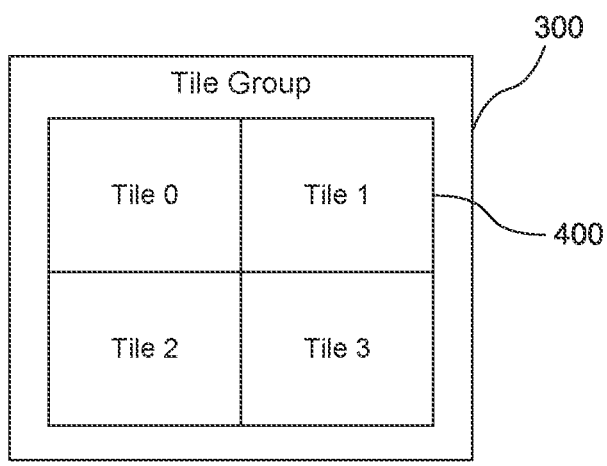
FIG. 4 is a schematic diagram of tiles within a tile group.

In the forgoing discussion, the geometry processing phase was presented as if control stream data is produced on a tile-by-tile basis. However, in some systems information pertaining to tile sections is grouped together into "tile groups". This is illustrated in FIGS. 3 and 4. FIG. 3 shows a frame buffer 128 divided into tile groups 300. A tile group 300 is a collection of tiles 400 arranged together within the rendering space, as shown in FIG. 4. In other words, the rendering space is sub-divided into regions, which in turn are sub-divided into tile sections, and the tile sections within a region form a tile group. In a particular example, and as shown in FIG. 4, a tile group 300 may be a collection of four spatially adjacent tiles 400. This example is used hereinafter for the purposes of illustration, but other groupings are possible.

When working with tile groups 300, the tiling unit 114 generates, as part of the control stream data (i.e. in addition to the control stream list), a region header control list that contains information about each tile group 300. FIG. 5 illustrates the structure of an example region header control list 500. The region header control list 500 comprises a region header 502 for each tile group 300 in the frame (i.e. each "region"). Each region header 502, as shown in FIG. 6, comprises settings 602, 604, for example in the form of flags, used to describe the tile group 300. The region header 502 contains a common set of settings or flags 602 that are applicable to all tiles (or a predetermined subset of tiles) within the tile group 300. The region header 502 also contains a per-tile set of settings or flags 604 for each individual tile 400 within the tile group 300. An example of a tile-specific flag could be an "empty flag", indicating that the tile 400 for which the flag is set contains no primitives. The tiling unit 114 is responsible for determining and writing such flags for each region header 502, and the specifics of the flags will depend on the system.

FIG. 7 illustrates an example of how tiling would work for an example tile group 300. When performing tiling, the tiling unit 114 would identify that: primitive A intersects with Tile 0, Tile 1 and Tile 3; primitive B intersects with Tile 1 and Tile 3; and primitive C intersects with Tile 0, Tile 1, Tile 2 and Tile 3. In this context 'intersects' means that at least part of the primitive at least partially overlaps the tile. It should also be noted that this example assumes a 'perfect tiling' method in which the precise edges of the primitive are used to judge tile intersection, as opposed to less precise (but perhaps computationally simpler) methods such as using an axis-aligned bounding box to judge which tiles are intersected. Although such alternative methods may wrongly identify primitives as being present in a tile, this will simply lead to over-specifying primitive data in the primitive blocks, and will not result in a rendering error.

Figure 8:
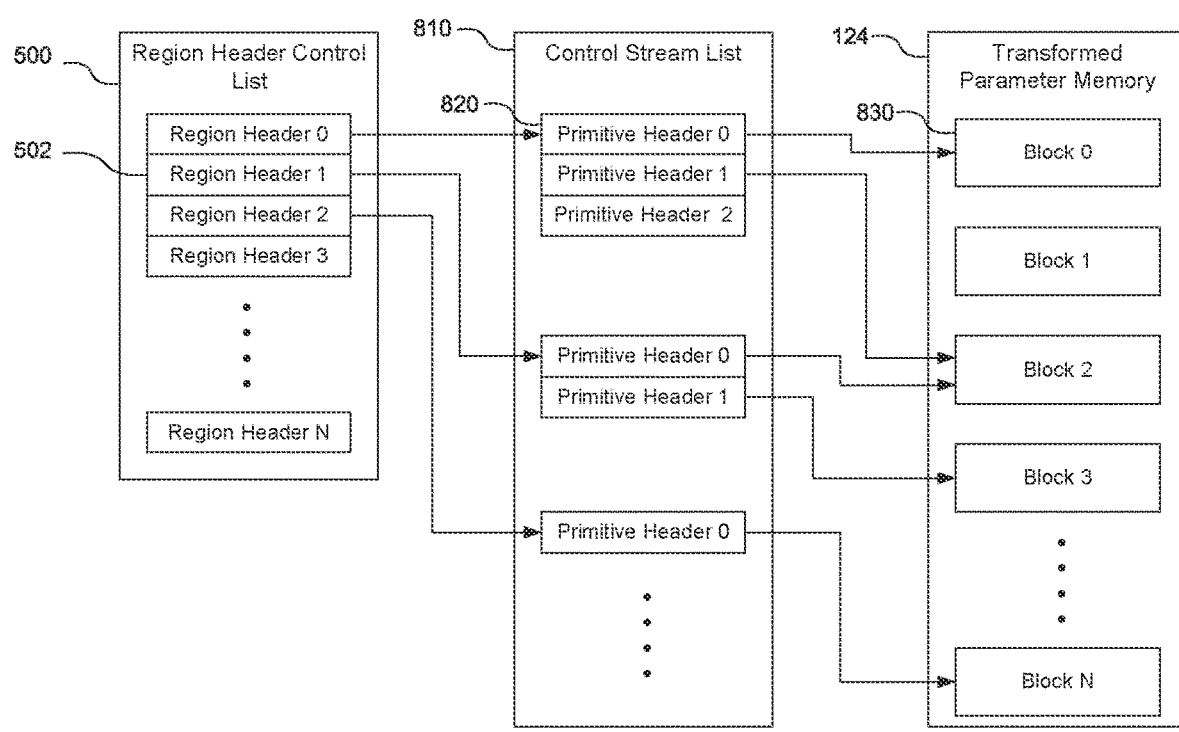
FIG. 8 shows an example of the composition and linking of a region header control list, a control stream list and a transformed parameter memory.

FIG. 8 shows an example of the composition and linking of the control stream data (region header control list 500 and control stream list 810) to the transformed parameter memory 124 (previously shown in FIG. 1).

Figure 9:
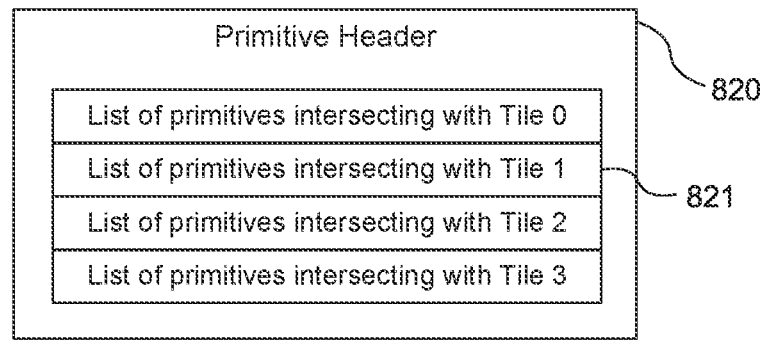
FIG. 9 is a schematic diagram of a primitive header.

When it comes to rendering in a system making use of tile grouping (in the absence of anti-aliasing), the parameter fetch unit 116 of FIG. 1 can read in region headers 502 sequentially from the region header control list 500. Each region header points to a control stream list 810 containing one or more primitive headers 820. As shown in FIG. 9, each primitive header 820 contains lists 821 of primitives associated with individual tiles within the relevant tile group 300. Each primitive header 820 points, as shown in FIG. 8, to a transformed parameter memory block 830 containing data defining a number of primitives (as discussed with respect to FIG. 1). As such, the primitive header 820 indicates which primitives of the referenced block 830 intersect with which tiles 400 within the tile group 300 linked by the associated region header 502. The parameter fetch unit 116 can thus use these data structures to decode information pertaining to a particular tile group 300 associated with a region header 502, and to send information about primitives associated with individual tiles to the HSR unit 118 for further processing (as has been discussed in more detail with respect to FIG. 1 above). After performing hidden surface removal, any visible fragments are sent to the HSR unit 118 to the texture/shader unit 120 for shading before being output into the frame buffer 128.

Anti-Aliasing

As mentioned above, anti-aliasing typically involves taking multiple samples in respect of a final screen-space pixel, to remove otherwise-jagged edges by blending colours from the different samples. The specifics of implementation can vary based on the particular architecture, but super-sample anti-aliasing (SSAA) may broadly involve taking multiple samples at every pixel. This is not very efficient, as it results in taking multiple samples (and then performing the associated processing) at image regions where there are no edges. Therefore developments of anti-aliasing such as multi-sample anti-aliasing (MSAA) have been made in which, for example, an application issuing instructions to the graphics processing system may set a nominal level of anti-aliasing required (e.g. 4×AA, indicating that samples should be taken from four sample points per pixel when anti-aliasing is applied) but samples from fewer sample points than the nominal level may be taken in certain regions of the image, e.g. if it is determined during rendering that a particular pixel is in the centre of a primitive (i.e. where there are no edges to be smoothed).

However, when considering such developments of anti-aliasing, conventional hardware tile-based graphics processing systems have still needed to process the same number of tiles as required to perform SSAA. In other words, in a tile-based system, the 'on-chip' memory accommodates the information required to process a certain number of samples as one 'tile'. If an image is processed with an anti-aliasing level that potentially requires twice as many samples for every pixel (compared to no anti-aliasing), then conventionally twice as many tiles (each tile covering half as many pixels) have been used to ensure that each tile has enough on-chip memory available to be processed (i.e. to accommodate a potential 'worst case' tile in which every pixel contains an edge), even if most tiles do not actually require two samples for every pixel to remove the appearance of jagged edges.

Below is presented an approach that allows a tile-based graphics processing system to process entire tiles at a different sample resolution (i.e. a different number of samples per pixel) to other tiles within the same frame.

Figure 10:
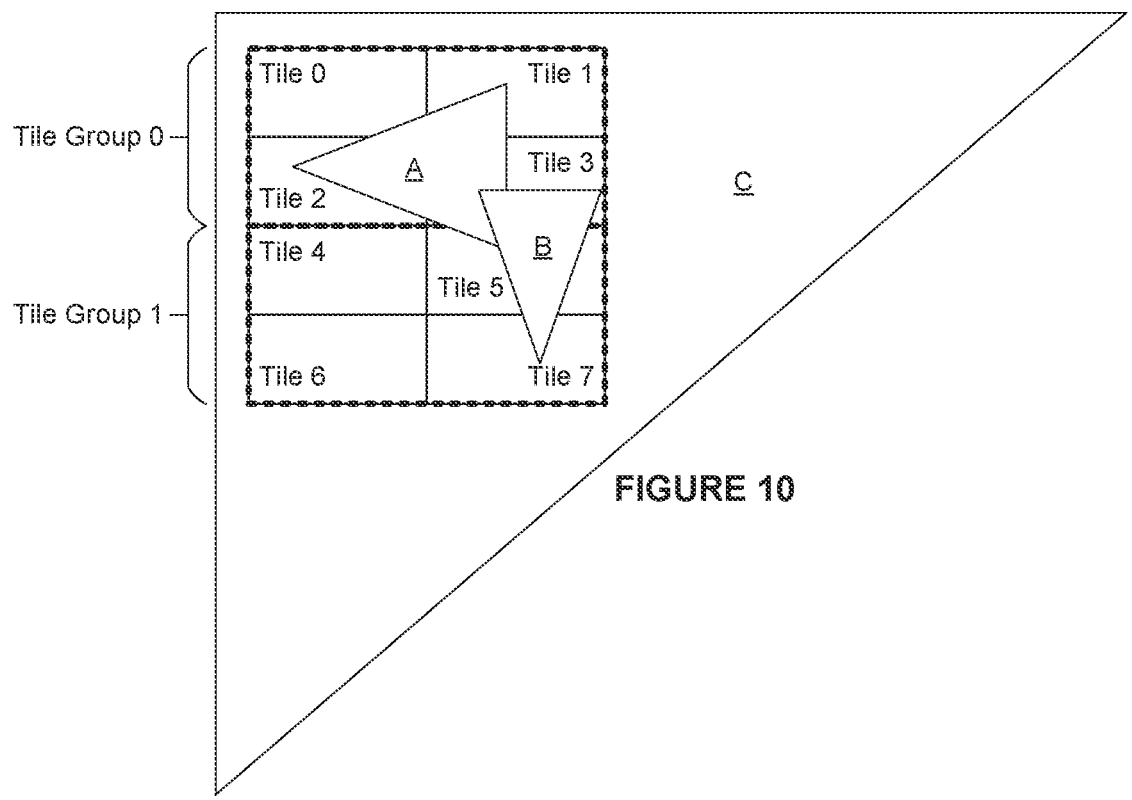
FIG. 10 shows an example of how primitives may intersect with tiles in two tile groups.

FIG. 10 shows a diagram similar to FIG. 7. However, compared to FIG. 7, FIG. 10 shows a situation in which a 2×AA level (for the purposes of this example requiring processing two samples per pixel in the Y direction, but only one sample per pixel in the X direction—however it will be appreciated that in another system 2×AA might mean two samples per pixel in the X direction, but only one sample per pixel in the Y direction, and the skilled person will understand how the ideas presented herein would apply accordingly) has been specified to the system (e.g. by an application). As a result, twice as many tiles are required to cover the same pixel area as tile group 300 in FIG. 7. For example, if each tile in FIG. 7 covers a 16×16 pixel area, then the tiles in FIG. 10 would be 16×8 pixels in area (and still 16×16 samples). As another example, it will be understood that if a 4×AA level (i.e. requiring processing two samples per pixel in both the X and Y direction) were specified to the system, then there would be 16 tiles overall covering the same area, each tile covering 8×8 pixels (and still 16×16 samples).

Returning to FIG. 10, eight tiles can be seen. These tiles are grouped into two tile groups: Tile Group 0 comprises Tile 0, Tile 1, Tile 2 and Tile 3, whilst Tile Group 1 comprises Tile 4, Tile 5, Tile 6 and Tile 7. Primitive A intersects with Tile 0, Tile 1, Tile 2, Tile 3 and Tile 5. Primitive B intersects with Tile 3, Tile 5 and Tile 7. Primitive C intersects with Tile 0, Tile 1, Tile 2, Tile 3, Tile 4, Tile 5, Tile 6 and Tile 7. As for FIG. 7, 'intersects' means here that a primitive at least partially overlaps the tile, and the intersections noted above are based on a 'perfect tiling' method.

It can be observed that Tiles 4 and 6 contain no primitive edges in FIG. 10 (N.B. this is not the same as containing no primitives—Tiles 4 and 6 both contain primitive C). Moreover, in combination, Tiles 4 and 6 take up the same screen area as single Tile 2 in FIG. 7. The present inventor has realised that in situations such as this, if anti-aliasing is disabled for Tiles 4 and 6, then those two tiles can be rendered in the hardware together, as a single larger tile with a lower sample resolution. That is, because neither Tile 4 nor Tile 6 contains any edges, anti-aliasing is not required to improve the appearance of those sections of the image. As a result, those sections can be processed at the 'normal' sample resolution of one sample per pixel. However, if each section were then processed through the hardware individually at that resolution, the processing for each tile would only use half the available resources. E.g., using the values from our earlier example for illustration only, each section would be only 16×8 samples, when the system is configured to handle sections of 16×16 samples. Instead, by combining the two sections and treating the combination as a single larger tile (in pixel terms) at the lower sample resolution, the larger single tile covers the full number of samples (e.g. 16×16 samples) that the system is configured to handle. As a result, overall, the rendering is performed using both fewer samples and fewer passes of the rendering logic—i.e. by rendering fewer tiles.

It will be noted that this approach can result in a distinction between what the tiling unit 114 considers to be "a tile" and what the rendering logic 106 renders as "a tile". The tiling unit 114 creates tiles of fixed sized based on the anti-aliasing setting supplied to the system 100 by an application, and can form tile groups accordingly. In other words, an application is taken to specify a "maximum" anti-aliasing level required for the render, which in turn implies the maximum sample resolution per pixel that will be required, and the tiling unit 114 creates tiles on the basis of that sample resolution, forming tiles covering a first number of pixels (also referred to as "tiles of a first pixel size" or "tiles of a first dimension"). However, if some of those tiles are determined to be free of edges, such that they can be combined and rendered at a lower sample resolution, then a tile covering a second, larger, number of pixels (also referred to as a "tile of a second pixel size" or "of a second dimension") is formed by that combination for the purposes of rendering. The rendering logic 106 can render tiles of both pixel sizes (dependent on whether edges have been determined to be present or not). In other words, the rendering logic 106 may process tiles with different dimensions, covering different pixel areas. However, a tile of the first pixel size, at the "maximum" sample resolution, will cover the same number of sample points as a tile of the second pixel size, at the lower sample resolution. Considered another way, a rendered image produced by this approach will have the maximum anti-aliasing level specified by the application (i.e. when the produced image is considered as a whole), but sections within that image will have been rendered at less than that maximum anti-aliasing level, with a lower sample resolution (i.e. fewer samples per pixel), without impacting the observed anti-aliasing.

Whilst the description above has considered enabling or disabling anti-aliasing based on an assessment of the edge-content of the tiles, it will be understood that the approach can also facilitate applying a reduced anti-aliasing level compared to that specified by an application. For example, if tiles were assessed to only contain horizontal edges, and an application was specifying a 4×AA level, then it would be possible to perform the rendering with a reduced 2×AA anti-aliasing level (i.e. because the extra horizontal samples in the 4×AA level, compared to the 2×AA level, are not so pertinent to the anti-aliasing result when all the edges are horizontal).

A method for performing rendering based on the approach outlined with respect to FIG. 10 is now described in more detail.

Figure 13:
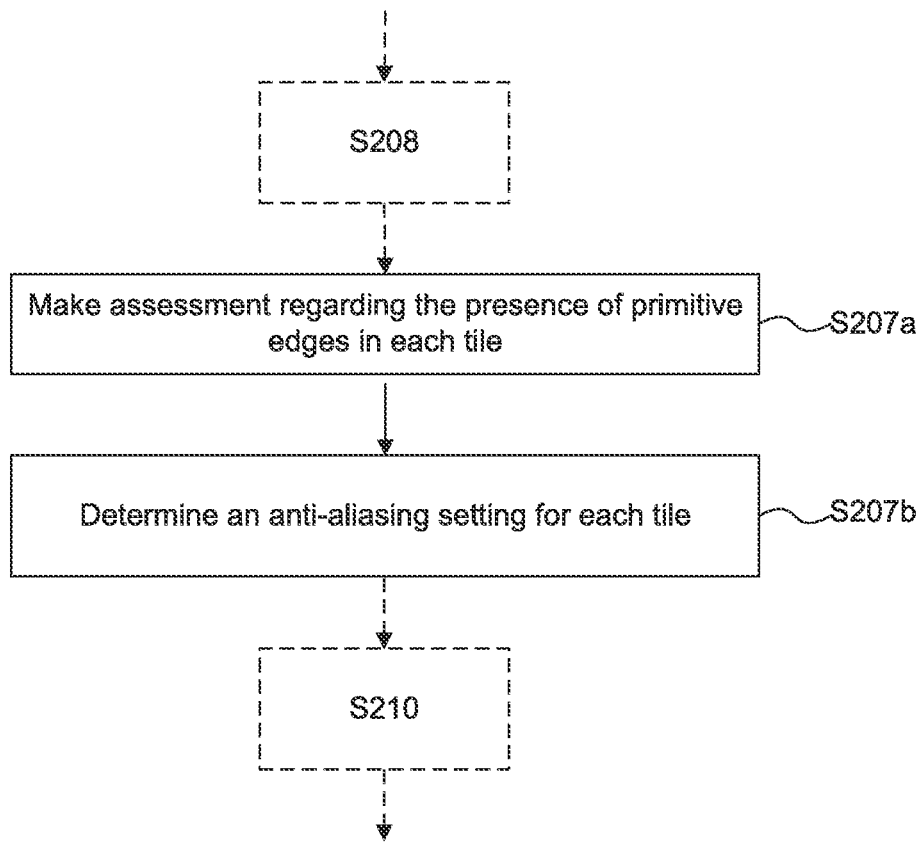
FIG. 13 shows a flowchart of method steps additional to those shown in FIG. 2.
Figure 14:
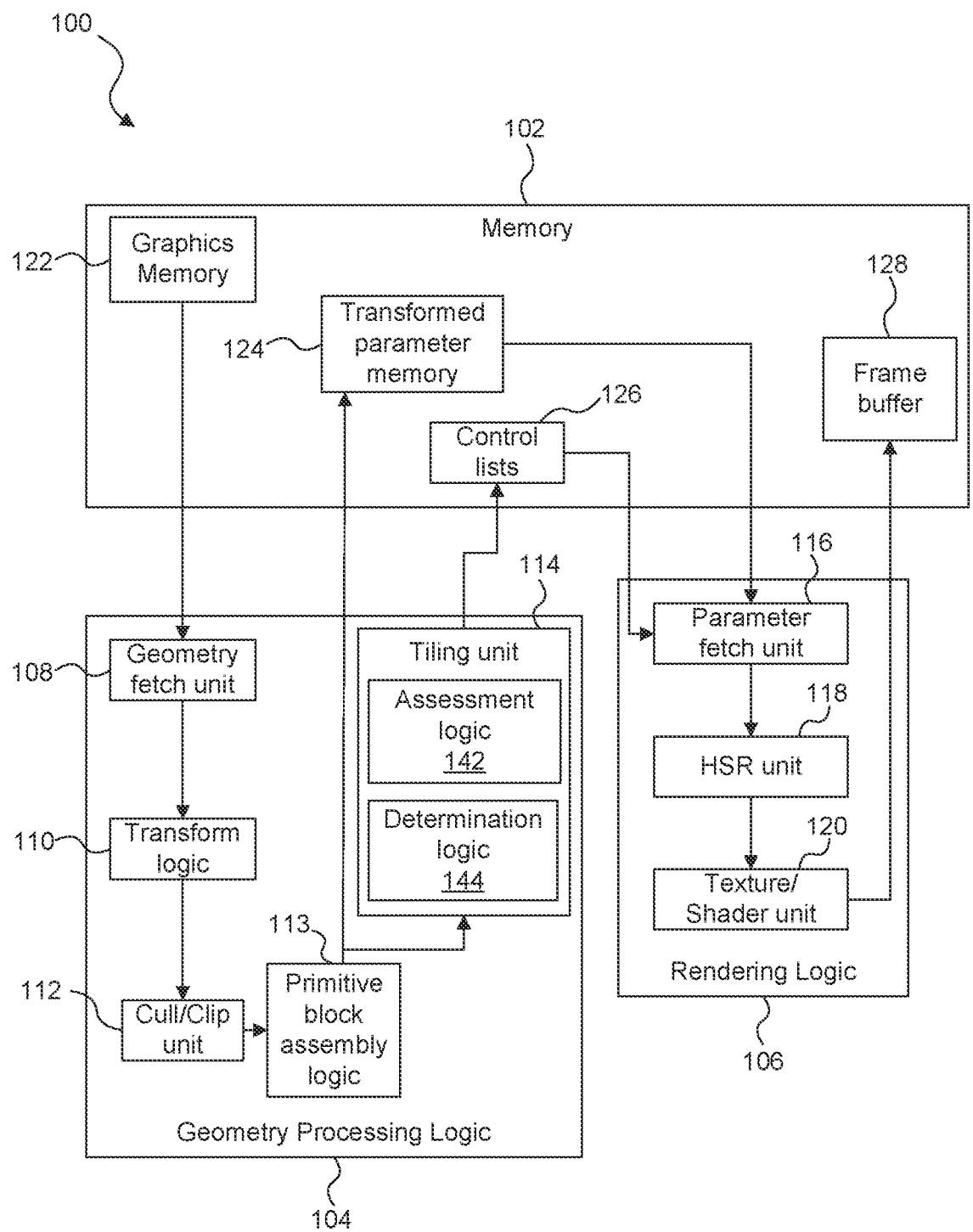
FIG. 14 shows a shows a tile-based graphics processing system with additional logic units compared to those shown in FIG. 1.

Initially, the geometry processing phase proceeds in much the same way as described above with respect to FIG. 2. However, as illustrated in FIG. 13 (which shows additional method steps inserted into the method of FIG. 2) having performed the S208 of tiling, the tiling unit 114, for example, additionally makes an assessment at step S207*a* regarding the presence of primitive edges in each tile (i.e. in each section of the rendering space, as divided according the anti-aliasing level specified by the application). The tiling unit 114, for example, then determines at step S207*b* an anti-aliasing setting for each section based on that assessment. The additional steps can be performed by assessment logic 142 and determination logic 144 provided in the tiling unit 114, for example. These logic units are shown in FIG. 14, which otherwise corresponds to FIG. 1, and are discussed in more detail below. However, it is noted that these additional steps are represented as separate to S208 in FIG. 13, but may be implemented in parallel with the tiling (e.g. as soon as one primitive is allocated to a tile, it may be possible to make the necessary assessment and determination, even if other primitives are added later). The anti-aliasing settings determined may be stored in memory as further discussed below.

Whether a tile contains an edge can be assessed in different ways.

In a simple implementation, the assessment logic 142 may make an assessment about whether edges of any type are present in a tile. That is the assessment may be, for the given tile, whether (i) there is (or may be) at least one edge of any type present or (ii) no edges are present at all. As such, the result of the assessment is indicative of whether anti-aliasing can be disabled for that tile (in situation (ii) anti-aliasing can be safely disabled, whereas that is not possible in situation (i)), and an anti-aliasing setting can then be determined accordingly. A very basic approach to this assessment would be to identify that empty tiles, not containing any primitives, do not contain edges, whilst all other tiles may contain edges. However, that would not identify tiles such as Tiles 4 and 6 in FIG. 10 as not containing edges. A more advanced approach would be to make the assessment as an extension of the calculations already performed by the tiling unit 114 (and known to the skilled person) to determine which primitives fall within which tiles. In particular, a 'perfect tiling' approach that allocates primitives to tiles based on the actual boundary of the primitive (i.e. as opposed to e.g. an axis-aligned bounding box around a primitive) would already take account of the primitive edges to allocate the primitives to the relevant tiles. That logic may be further configured, for example, to find that a tile containing a primitive vertex (and is thus found to contain that primitive) will also contain an edge. Similarly, the tiling logic may be configured to find that any tiles with a side intersected by an edge of primitive (and is thus found to contain that primitive) will also contain an edge. As the skilled person would know, the intersection calculations can be performed starting from the coordinates of the primitive vertices as defined in the transformed geometry data and the coordinates of the tile corners. The edges of the primitives and the sides of the tiles can be represented as lines connecting adjacent vertices (e.g. each described by an interval on a more general line equation passing through the relevant vertices), and calculations can then be performed to determine if any edge of a primitive intersects with any side of a tile.

In other implementations, it is possible to make more complex assessments about the presence of primitive edges in the tiles. In particular, in some examples it is possible to make an assessment that takes into account the type of edges that are present.

For example, some tiles may contain edges between primitives that are not intended to be visible and thus do not require anti-aliasing. This might occur, for example, where more than one primitive is required to represent all or part of an object. A trivial example is where a quadrilateral of uniform colour is represented by two triangles, so that there is a shared edge between the triangles along one of the diagonals of the quadrilateral—that diagonal is not intended to be visible to the user. A more complex example might be where a curved surface is divided into many triangular primitives to approximate that surface—the edges between those triangles do not represent intended discontinuities in the actual object being rendered. These types of primitive edges, which are not intended to represent a visual discontinuity, may be referred to as 'internal' edges, as they are usually internal to an objected being represented. In such scenarios, the assessment logic 142 may be configured to assess that a particular edge is of a particular type, e.g. one that does not represent a visual discontinuity (i.e. that it is in an internal edge), and take that into account when determining a corresponding anti-aliasing setting. For example, the assessment regarding the presence of primitive edges may be an assessment, for the given tile, as to whether (i) there is at least one edge present that is not an internal edge or (ii) there are either no edges present or only internal edges present. As such, the result of the assessment is indicative of whether anti-aliasing can be disabled for that tile (in situation (ii) anti-aliasing can be safely disabled, whereas that is not possible in situation (i)), and an anti-aliasing setting can then be determined accordingly.

As another example, some primitives and their edges may be nominally visible within a 3D scene, but invisible in a particular render from a particular viewpoint because they are hidden by other primitives in the scene. In the system of FIG. 14, such primitives will still be allocated to tiles (noting that that shows a system in which hidden surface removal occurs after the tiling). However, when making the assessment regarding the presence of primitive edges in each tile, the assessment logic 142 may identify (e.g. from the contents of the tiling information) that a tile contains a primitive edge that is hidden by another primitive and identify that as a type of edge (i.e. a hidden edge) that does not require anti-aliasing. That is, the assessment regarding the presence of primitive edges may include an assessment, for the given tile, as to whether (i) there is at least one edge present that is not a hidden edge or (ii) there are either no edges present or only hidden edges present. As such, the result of the assessment is indicative of whether anti-aliasing can be disabled for that tile (in situation (ii) anti-aliasing can be safely disabled, whereas that is not possible in situation (i)), and an anti-aliasing setting can then be determined accordingly.

It will be understood that the two previous examples regarding internal and hidden edges have been discussed separately, but may be combined. That is, an assessment can be made that takes into account the types of edges that are present that includes consideration of both hidden and internal edges. An assessment can be made as to whether (i) there is at least one edge present that is a type of edge for which anti-aliasing will visibly affect the output or (ii) there are either no edges present or only edges for which anti-aliasing should not visibly affect the output. As such, the result of the assessment is indicative of whether anti-aliasing can be disabled for that tile (in situation (ii) anti-aliasing can be safely disabled, whereas that is not possible in situation (i)), and an anti-aliasing setting can then be determined accordingly.

As already mentioned, another form of assessment could be regarding the orientation of the edges in a tile. If all the edges are vertical, for example, then extra anti-aliasing samples in the vertical direction will not visibly affect the output. Similarly, if all the edges are horizontal then extra anti-aliasing samples in the horizontal direction will not visibly affect the output. In such cases, an assessment can be made as to whether (i) there is at least one orientation of edge present for which anti-aliasing in a particular dimension will visibly affect the output or (ii) there are either no edges present or only edges with an orientation for which anti-aliasing in a particular dimension should not visibly affect the output. As such, the result of the assessment is indicative of whether an anti-aliasing level can be reduced for that tile (in situation (ii) an anti-aliasing level can be reduced to avoid additional samples in the dimension in question, whereas that is not possible in situation (i)), and an anti-aliasing setting can then be determined accordingly (in this case, perhaps determining an anti-aliasing level that is less than the maximum level specified by the application, but which is non-zero—e.g. 2×AA instead of 4×AA). Again, this form of assessment regarding the orientation of the edges could be combined with the forms of assessment already discussed.

When determining an anti-aliasing setting based on the assessments regarding the presence of primitives' edges in the tiles, different approaches are possible.

In one approach each individual tile could be provided with an individual anti-aliasing setting (e.g., if a tile is found to contain no edges then an anti-aliasing setting may be set to "off", and if a tile is found to contain (or may contain) an edge of any type then the anti-aliasing setting may be set to "on"). The anti-aliasing settings determined for the tiles or subset of tiles may be stored in memory. Conveniently, in the tile-group based system previously described, the anti-aliasing settings for tiles within a tile group 300 may be stored in the region header 502 for the tile group. If settings are determined individually for each tile, these settings could be stored in the tile specific flags 604 for the relevant tiles in the region header 602. However, as explained above, the benefit of the present approach is most fully realised where multiple tiles from the geometry processing phase can later be grouped together to form one combined tile in the rendering phase.

Therefore, in another approach, an anti-aliasing setting may be determined that applies to more than one tile. For example, the anti-aliasing setting may apply to a subset of the tiles in a tile group. As used herein, the term "subset" includes a set of tiles fewer than all the tiles in the group (i.e. a "proper subset") as well as a set of all the tiles in the tile group. In particular the anti-aliasing setting may apply to a subset of tiles in a tile group that can be combined to form one combined tile in the rendering phase that covers the same number of sample points, in the absence of anti-aliasing, as the individual tiles sized in the geometry processing phase with an assumption that anti-aliasing will be performed. It also, therefore, follows that there can be multiple subsets within a tile group, with each subset having their own anti-aliasing setting determined.

In one example implementation, with reference to FIG. 10, the determination logic 144 may be configured to consider particular subsets of tiles when determining the anti-aliasing settings. For instance, recalling that FIG. 10 illustrates a situation in which a 2×AA level has been specified by the application, in Tile Group 0 the left two tiles (Tile 0 and Tile 2) may be considered as a first subset of the tile group that could be combined to form one tile at the point of rendering, and similarly the right two tiles (Tile 1 and Tile 3) could be treated as a second subset. In this scenario, a single setting may be used for the first subset to indicate if all (i.e. both) tiles within the subset have been assessed to be ones for which anti-aliasing can be turned off, or if at least one of the tiles in the subset has not been assessed to be one for which anti-aliasing can be turned off. Similarly, another setting may be used for the second subset to indicate if all (i.e. both) tiles within the subset have been assessed to be ones for which anti-aliasing can be turned off, or if at least one of the tiles in the subset has not been assessed to be one for which anti-aliasing can be turned off. These settings may be stored in the region header for the tile group. For example, one bit may act as a flag to indicate if anti-aliasing is "on" or "off" for the first subset (e.g. based on whether the bit is set to one or zero) and another bit may act as another flag to indicate if anti-aliasing is "on" or "off" for the second subset.

It will thus be apparent that although the individual tiles may be assessed by the determination logic 144 with respect to the presence of edges, the anti-aliasing setting determined for an individual tile may take account of not only the assessment of that particular tile, but also of at least one other tile (i.e. the other tiles in the relevant subset). It will also be apparent that this may lead to circumstances in which a tile is identified as having no edges but that is still processed with anti-aliasing "on", when another tile in the subset does contain edges.

It will also be appreciated that the particular subsets discussed above are not the only options. In other implementations, still with reference to Tile Group 0 in FIG. 10, a first subset might comprise the top two tiles Tile 0 and Tile 1, whilst the second subset might comprise the bottom two tiles Tile 2 and Tile 3 (i.e. the subsets might be constructed as rows rather than columns within the tile group) or the subsets could even be constructed from diagonally opposite tiles within the tile group (e.g. Tile 0 and Tile 3; Tile 1 and Tile 2). Different arrangements may be preferable in different situations.

In some embodiments, the determination logic 144 may be configured to create any possible subset that allows for a combined tile to be processed in the rendering logic, with anti-aliasing disabled, that covers the same number of samples as a tile processed with anti-aliasing enabled. That is, the system may actively search for subsets that allow the anti-aliasing to be disabled. However, whilst this can reduce the rendering load, it comes at the expense of further complexity, and so in other embodiments the available subsets for consideration may be predetermined for a given requested anti-aliasing level, to make the hardware logic simpler and smaller.

More generally, considering anti-aliasing levels other than just the 2×AA level illustrated in FIG. 8, it may not be possible to create a subset smaller than the entire tile group, whilst still covering the same number of sample points as a tile with anti-aliasing disabled. For example, at 4×AA all four tiles in a tile group would need to be grouped together to create one combined tile covering the same number of sample points as one of the tiles processed with anti-aliasing. At still higher levels of anti-aliasing, groups of tile groups might need to be combined to produce on combined tile covering the same number of sample points as one of the tiles processed with anti-aliasing.

The anti-aliasing settings determined for a subset of tiles may be stored in memory. As already mentioned, the anti-aliasing settings for tiles within a tile group 300 may be stored in the region header 502 for the tile group. For example, with reference to FIG. 6, the settings applicable to subsets of tiles in a group, particularly when those subsets are predefined, could be stored in the common flags 602. Then, when the system 100 comes to render the tile group 300, the rendering logic 106 (e.g. the parameter fetch unit 116) reads the region header 502 and performs the rendering accordingly. In particular, if the region header 502 indicates that anti-aliasing should be enabled for all tiles within the tile group 300, then the tiles of the tile group 300 (i.e. the tiles as determined by the tiling unit 114) can be processed individually, in the usual way, with the anti-aliasing level specified by the application. In other words, a setting that anti-aliasing should be enabled means that the anti-aliasing level specified by the application should be used. In contrast, if the region header 502 indicates that at least one subset of the tiles within the tile group 300 should be processed without anti-aliasing (i.e. there is at least one relevant setting indicating that anti-aliasing should be turned off for a particular subset), then the rendering logic 106 (e.g. the parameter fetch unit 116) would process that subset as a single combined tile without anti-aliasing (i.e. at a lower sample resolution than if the maximum anti-aliasing level specified by the application). In other words, a setting that anti-aliasing should be disabled means no anti-aliasing occurs, despite the fact that the application has specified a (non-zero) anti-aliasing level. In some scenarios, a tile group may contain a subset for which anti-aliasing is disabled as well as one or more individual tiles for which anti-aliasing is enabled. In those situations, the rendering logic can handle the different tiles and subsets in accordance with their different settings.

The above description has generally considered an implementation in which the logic for determining the anti-aliasing settings is part of the tiling unit (114), which also includes the assessment logic for making the assessments regarding the presence of primitive edges, in the geometry processing logic (104). However, in other arrangements, these logic blocks could be provided, within the geometry processing logic (104) but separately from tiling unit (114). In still other arrangements, the determination logic 144 could be part of the rendering logic (106). For example, the geometry processing logic (104) could write individual flags reflecting the outcome of the assessment regarding the presence of edges for each individual tile in a tile group, and it could be determination logic 144 within the rendering logic 106 (e.g. the parameter fetch unit 116) that reads the individual flags and uses them to determine whether any tiles can be grouped together and rendered with a different anti-aliasing level. As such, in this situation, it is the rendering logic 106 that actively determines the anti-aliasing setting, as opposed to implementing a setting determined by the geometry processing logic 104. In other scenarios the determination logic 144 could be distributed between the geometry processing logic 104 and the rendering logic 106. For example, a system could be configured to provide two specific region header 502 flags for a tile group 300 of four tiles 400, one flag indicating an anti-aliasing setting for the left two tiles in the group and one flag relating to an anti-aliasing setting for the right two. The flags, set during the geometry processing phase, could be determined based on whether the respective two tiles can be combined to be rendered at a lower anti-aliasing level (i.e. based on an assessment regarding the presence of edges in each of the respective two tiles). Such a flag could be used in the rendering phase to directly to enable or disable a 2×AA level, specified by an application, for the relevant two tiles. However, if an application requests a 4×AA level, then the rendering logic could interpret these two flags to determine whether all four tiles in the group can be combined and rendered at a lower anti-aliasing level—i.e. if each flag indicated that its respective two tiles can be combined, then all four tiles can be combined. In this case the rendering logic is making a further determination based upon the determination made in the geometry processing phase.

Although the approaches described herein have general applicability, they may be of particular benefit in situations where tiles contain primitives that do not intersect and/or cross with each other, such as in, for example, simple graphical user interfaces (GUIs) or scenes where all primitives have a common depth value (e.g. 2D scenes) or each have a unique depth value (e.g. 2.5D scenes). In the case of a simple GUI, primitives may be distributed sparsely through the scene, and objects may be unlikely/unintended to overlap. As a result, there may be tiles with no primitives, and/or tiles containing (and perhaps covered by) only a single primitive. Such situations may derive particular benefit from the implementations described above, as there may be large numbers of tiles containing no edges. In the case where all primitives are known to have a common depth value (e.g. for a 2D scene) or to each have a unique depth value (e.g. 2.5D scenes), it is known in advance that primitives will not intersect, and thus the identification of edges can be simpler. As a result, this also particularly lends itself to implementing the presently disclosed approach for determining an anti-aliasing setting. In general, therefore, it may be desirable to configure systems to make the previously described assessment regarding the presence of edges and/or determination about an anti-aliasing setting when the system identifies that tiles contain primitives that do not intersect and/or cross with each. In other situations, the system may instead use the application supplied/maximum anti-aliasing setting.

It is also possible for some graphics pipelines to include techniques for discarding primitives in the geometry stage, e.g. if it is known that those primitives will not be visible in the rendered image. For example, see GB 2510964B and GB 2524121B. Such systems not only simplify the determination regarding the presence of edges by eliminating primitives at an early stage, so they are not added to a control steam, but may also be particularly suited to identifying tiles in which primitives do not visibly intersect or cross with each other (e.g. because they may track if a 'closest' primitive in a tile entirely covers that tile and/or other primitives in that tile), and thus contain no edges or only edges between a background and a primitive. As a result, such systems may also be particularly suited to the approach discussed herein.

It will be appreciated that the description has generally referred to disabling or enabling anti-aliasing for a section of the image to be rendered. This may refer collectively to disabling or enabling all types of anti-aliasing that would otherwise be applicable to a particular section, or may refer to just disabling a particular type of anti-aliasing for that section.

Figure 11:
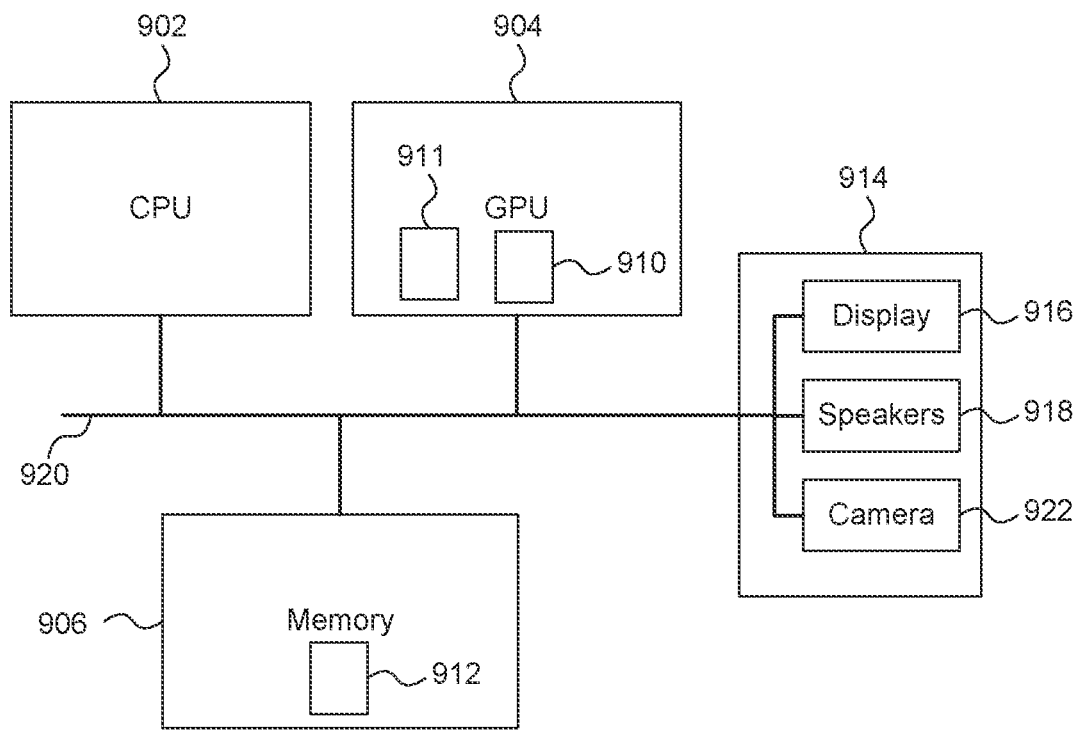
FIG. 11 shows a computer system in which a graphics processing system is implemented.

FIG. 11 shows a computer system in which the graphics processing systems described herein may be implemented. The computer system comprises a CPU 902, a GPU 904, a memory 906 and other devices 914, such as a display 916, speakers 918 and a camera 922. A processing block 910 (which can correspond to geometry processing logic 104 and rendering logic 106) is implemented on the GPU 904, as well as a Neural Network Accelerator (NNA) 911. In other examples, the processing block 910 may be implemented on the CPU 902 or within the NNA 911. The components of the computer system can communicate with each other via a communications bus 920. A store 912 (corresponding to store 112) is implemented as part of the memory 906.

While FIG. 11 illustrates one implementation of a graphics processing system, it will be understood that a similar block diagram could be drawn for an artificial intelligence accelerator system—for example, by replacing either the CPU 902 or the GPU 904 with a Neural Network Accelerator (NNA) 911, or by adding the NNA as a separate unit.

The graphics processing systems of FIGS. 1 and 14 are shown as comprising a number of functional blocks. This is schematic only and is not intended to define a strict division between different logic elements of such entities. Each functional block may be provided in any suitable manner. It is to be understood that intermediate values described herein as being formed by a graphics processing system need not be physically generated by the graphics processing system at any point and may merely represent logical values which conveniently describe the processing performed by the graphics processing system between its input and output.

The graphics processing systems described herein may be embodied in hardware on an integrated circuit. The graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 12.

Figure 12:
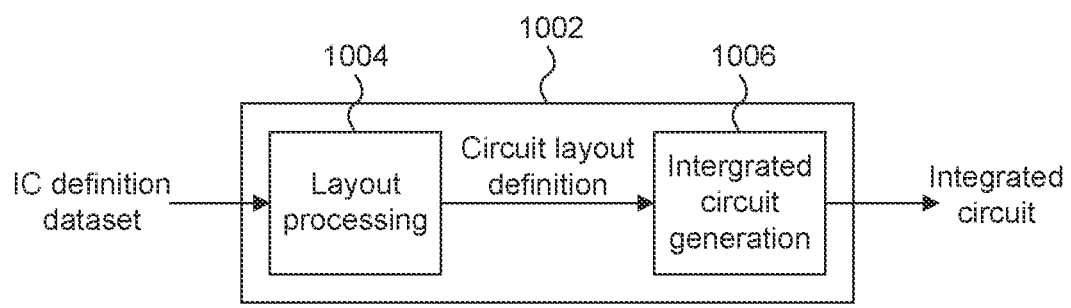
FIG. 12 shows an integrated circuit manufacturing system for generating an integrated circuit embodying a graphics processing system.

FIG. 12 shows an example of an integrated circuit (IC) manufacturing system 1002 which is configured to manufacture a graphics processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 1002 to manufacture an integrated circuit embodying a graphics processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A tile-based graphics processing system, wherein the graphics processing system comprises:
   determination logic configured to determine, for each tile, an anti-aliasing setting for the tile based on an assessment regarding the presence of primitive edges in the tile.

2. The tile-based graphics processing system according to claim 1, wherein the determination logic is configured to determine the anti-aliasing setting for the tile based on the assessment regarding the presence of primitive edges in the tile and at least one other assessment regarding the presence of primitive edges in at least one other tile.

3. The tile-based graphics processing system according to claim 1, further comprising assessment logic configured to make the assessment, for each tile, regarding the presence of primitive edges in the tile, and wherein the assessment logic forms part of a geometry processing logic.

4. The tile-based graphics processing system according to claim 3, wherein the geometry processing logic is further configured to produce a per-region region header, comprising common settings applicable to the tiles within the group of tiles forming the region.

5. The tile-based graphics processing system according to claim 1, wherein the tile-based graphics processing system is configured to use a rendering space divided into regions, each region comprising a group of tiles, and wherein the determination logic is configured to determine a common anti-aliasing setting for a subset of the tiles within a region.

6. The tile-based graphics processing system according to claim 1, wherein the tile-based graphics processing system is configured to use a rendering space sub-divided into tiles based on a number of samples each tile contains at a maximum anti-aliasing setting, and further comprising:
   rendering logic configured to render the rendering space tile-by-tile at a maximum anti-aliasing setting.

7. The tile-based graphics processing system according to claim 5, wherein the rendering space is sub-divided into tiles based on a number of samples each tile contains at a maximum anti-aliasing setting, and further comprising:
   rendering logic configured to render the rendering space tile-by-tile at a maximum anti-aliasing setting, wherein the rendering logic is further configured to render together, rather than tile-by-tile, the tiles within a subset of tiles of a region that have a common anti-aliasing setting that is not the maximum anti-aliasing setting.

8. The tile-based graphics processing system according to claim 7, wherein the rendering logic is configured to render the subset of tiles, within a region, together by rendering the subset of tiles together at a lower sample resolution than when rendering a tile at the maximum anti-aliasing setting.

9. The tile-based graphics processing system according to claim 1, wherein determining the anti-aliasing setting for a tile comprises enabling or disabling anti-aliasing for the tile.

10. A method of manufacturing a graphics processing system as set forth in claim 1, comprising inputting a computer readable dataset definition of said graphics processing system into an integrated circuit manufacturing system and causing said integrated circuit manufacturing system to manufacture said graphics processing system according to said computer readable dataset definition.

11. A non-transitory computer readable storage medium having stored thereon an integrated circuit definition dataset that, when processed in an integrated circuit manufacturing system, configures the integrated circuit manufacturing system to manufacture a graphics processing system as set forth in claim 1.

12. An integrated circuit manufacturing system configured to manufacture a graphics processing system as set forth in claim 1.

13. A method of rendering primitives in a tile-based graphics processing system, wherein the method comprises:
   determining, for each tile, an anti-aliasing setting based on an assessment regarding the presence of primitive edges in the tile.

14. The method according to claim 13, wherein determining an anti-aliasing comprises determining the anti-aliasing setting for the tile based on the assessment regarding the presence of primitive edges in the tile and at least one other assessment regarding the presence of primitive edges in at least one other tile.

15. The method according to claim 13, further comprising making the assessment, for each tile, regarding the presence of primitive edges in the tile as part of a geometry processing phase.

16. The method according to claim 13, wherein the tile-based graphics processing system is configured to use a rendering space divided into regions, each region comprising a group of tiles, and wherein determining an anti-aliasing setting further comprises determining a common anti-aliasing setting for a subset of the tiles within a region.

17. The method according to claim 16, wherein the rendering space is sub-divided into tiles based on a number of samples each tile contains at a maximum anti-aliasing setting, and the method further comprises:
   a rendering phase comprising rendering the rendering space tile-by-tile for tiles with a maximum anti-aliasing setting, wherein the rendering phase further comprises rendering together, rather than tile-by-tile, the tiles within a subset of tiles of a region that have a common anti-aliasing setting that is not the maximum anti-aliasing setting.

18. The method according to claim 17, wherein the rendering together is performed by rendering the subset of tiles together at a lower sample resolution than when rendering a tile at the maximum anti-aliasing setting.

19. The method according to claim 13, wherein the tile-based graphics processing system is configured to use a rendering space sub-divided into tiles based on a number of samples each tile contains at a maximum anti-aliasing setting, and the method further comprises:
   a rendering phase comprising rendering the rendering space tile-by-tile for tiles with a maximum anti-aliasing setting.

20. A non-transitory computer readable storage medium having stored thereon computer readable code configured to cause the method as set forth in claim 13 to be performed when the code is run.

* * * * *